Nov. 14, 1933.  H. NEUWIRTH  1,934,874
MICROSCOPE
Filed April 4, 1933
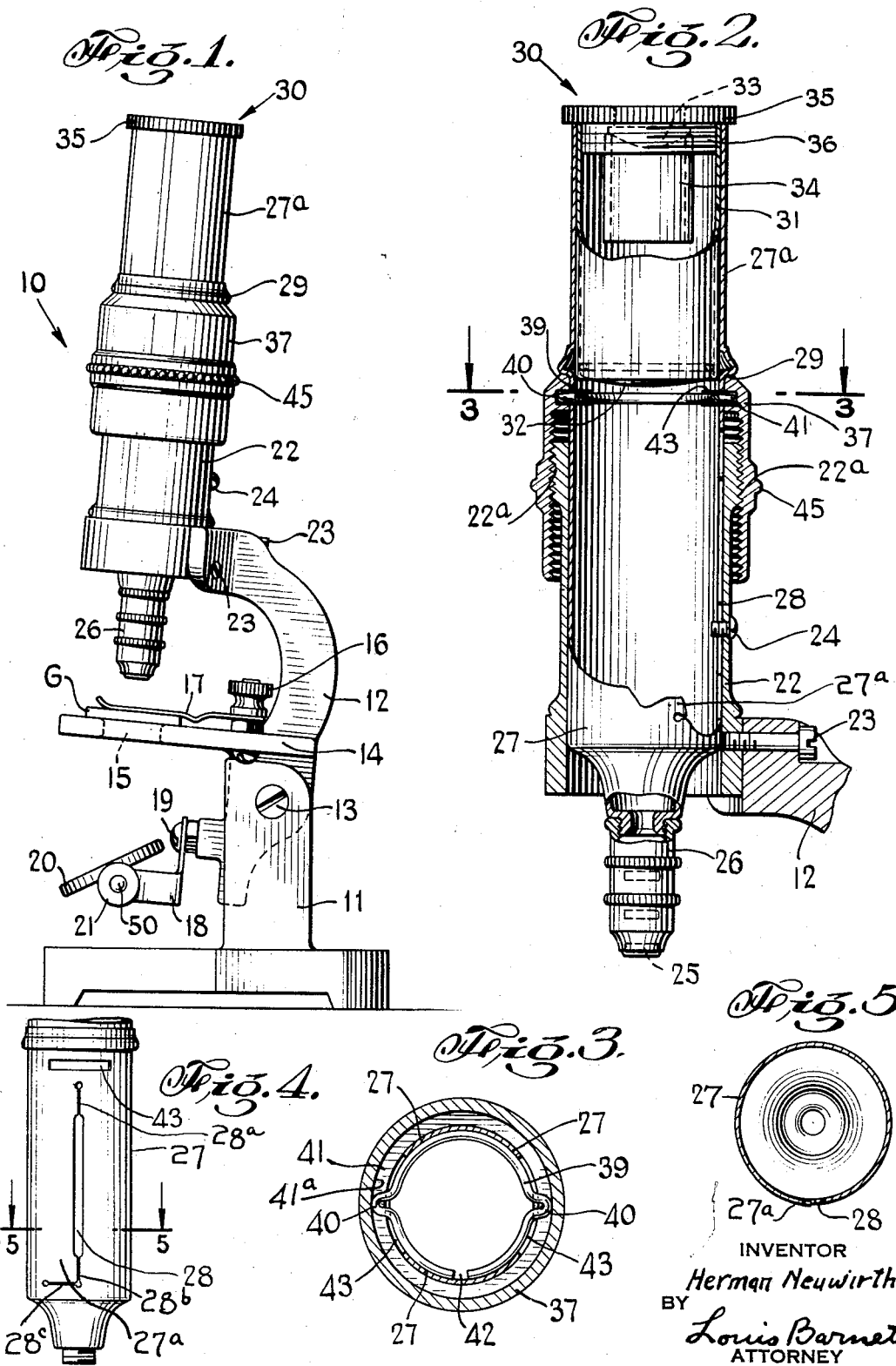
INVENTOR
Herman Neuwirth
BY
Louis Barnett
ATTORNEY Patented Nov. 14, 1933

1,934,874

UNITED STATES PATENT OFFICE 1,934,874

MICROSCOPE

Herman Neuwirth, New York, N. Y.

Application April 4, 1933. Serial No. 664,299

1 Claim. (Cl. 88—39)

The present invention relates to microscopes and, more particularly, to the mechanical structure rather than the optical portions thereof.

In certain types of microscopes now on the market for home or pocket use, pairs of telescoping tubes are employed which are joined with one another by a threaded coupling, assemblies of this type being compact and cheaper to manufacture. It has been found, however, that the tube supporting the objective, especially after the microscope has been in use for some time gets worn and is subject to objectionable lateral rocking.

One of the objects of the present invention is to provide means for eliminating such lateral rocking movement.

Another object is to provide resilient means operative to take up wear and to eliminate either lateral or longitudinal play in the tubes forming part of a microscope assembly.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claim.

In the accompanying drawing, in which is shown one of the possible illustrative embodiments of this invention, Figure 1 is a side elevational view of microscope constructed to embody the invention;

Figure 2 is a fragmentary sectional view taken through the tube of the microscope assembly shown in Figure 1;

Figure 3 is a cross sectional view taken on line 3—3 of Figure 2;

Figure 4 is a fragmentary side elevational view of the inner tube removed from the assembly shown in Figures 2 and 3, showing the spring wall construction; and Figure 5 is a cross sectional view taken on line 5—5 in Figure 4.

Referring to the various figures of the drawing, 10 represents a microscope constructed to embody the invention having a foot or stand 11 pivotally supporting a stanchion or upright 12 by means of a pivot joint connection 13 of any conventional type. Stanchion 12 may be formed integrally with a platen 14 having a central opening 15 formed therein. Said platen supports spaced knurled nuts 16 adapted to retain suitable spring clips 17 of any conventional type in any position of adjustment for retaining specimen glass G. Stanchion 12 also supports a bifurcated bracket 18 pivotally mounted by means of a screw 19. The bifurcated portion of bracket 18 is provided with openings adapted to serve as journal bearings for a shaft 50 threaded at both ends, said shaft supporting an oscillatable mirror 20. A pair of knurled nuts 21 engage with the threaded extremities of shaft 50 and maintain the latter and the mirror in a desired adjusted position.

The assembly supporting the microscope lenses is composed of an external tube or shell 22 rigidly supported by the stanchion 12 by means of screw 23 and having an external thread 22ª formed on the upper end thereof. A screw 24 threadedly engages with tube 22 and serves as a male guide as hereinafter indicated. The objective 25 of the microscope is supported on a detachable casing 26 and the latter is demountably secured to move with a longitudinally extending inner tube 27 provided with an elongated slot 28 positioned to register with and adapted to be guided by screw 24. Tube 27 may include an outwardly protruding abutment shoulder 29. A tubular portion 27ª extends above the shoulder 29 and supports an eye piece assembly 30. This latter assembly is composed of a tube 31 slidably engaging with tube portion 27ª and supporting a first lens 32 and a second lens 33, lens 33 being supported in a separate tubular element 34 integral with a cap 35 screwed into an internal thread 36 in tube 31. Upward and downward movement of tube 27 is effected by means of a threaded sleeve or collar coupling 37 engaging with thread 22ª formed on the upper extremity of shell 22.

In order to operatively connect tube 27 to sleeve coupling 37 and, at the same time, correct any tendency of tube 27 to move or rock laterally after the moving parts have been subjected to wear, use is made of an expansion split spring ring 39. By reference to figures 2 and 3, it will be seen that the spring ring fits, for the most part inside tube 27 and is provided with a pair of extending portions or teats 40 fitting into an appropriate annular recess 41 formed in sleeve coupling 37. From figure 3 it is seen that sufficient space 42 is left between the ends of spring ring 39 to permit the insertion and removal of the spring by approximation of the free extremities thereof.

In assembling the telescopic portions of the microscope, sleeve coupling 37 is first mounted in threaded engagement with threads 22ª. Tube 27 is then lowered into the interior of shell 22 until shoulder 29 abuts against the upper extremity of sleeve coupling 37. A pair of lateral openings 43 formed in tube 27 will then be found to be in alignment with annular recess or groove 41. It suffices then to spring together the free extremities of ring 39, to lower the latter into tube 27 until teats 40 are in register with openings 42 and to release the ring to completely assemble elements 27, 22, and 37 as shown in Figure 2.

Once the microscope has been assembled, upward and downward movement of tube 27 may be effected by rotating sleeve coupling 37, milled finger grip projections 45 being provided for this purpose.

The structure and position of spring ring 39 is such as to compensate any tendency toward lateral movement of tube 27 inside shell 22 particularly when, through use, play is developed at the threaded joint between sleeve coupling 37 and threads 22$^a$. By making the teats 40 sufficiently long to bear against the bottom side 41$^a$ of the groove 41, a frictional contact is provided which acts in taking up any existing lateral play.

To further correct any tendency of the lower end of the tube 27 to rock laterally the wall of said tube may be slitted as at 28$^a$ and 28$^b$, these being prolongations of the slot 28. The slit 28$^b$ may have a branch slit 28$^c$ which forms the wall portion 27$^a$ adjacent said slot and slits into a spring tongue for frictionally engaging the inner surface of the outer tube 22.

It will thus be seen that there is provided a device in which the several objects of this invention are achieved and which is well adapted to meet the conditions of practical use.

As various posible embodiments might be made of the above invention, and as various changes might be made in the embodiment set forth, it is to be understood that all matter herein set forth or shown in the accompanying drawing is to be interpreted as illustrative and not in a limiting sense.

Having thus described my invention, I claim as new and desire to secure by Letters Patent:

In combination with the stand of a microscope, an externally threaded tube supported on said stand, a rotatable sleeve coupling threadedly engaging with said tube, said sleeve having an annular groove formed therein, a second tube slidably mounted inside said threaded tube and having an opening in a lateral wall thereof, said second tube being provided with a shoulder positioned to abut against one extremity of said sleeve, and a spring ring having a protruding portion formed thereon, said ring being mounted to lie inside said second tube with said protruding portion passing through the opening in the lateral wall thereof and extending into the groove in said sleeve.

HERMAN NEUWIRTH.